US011540377B2

(12) United States Patent
Lee et al.

(10) Patent No.: US 11,540,377 B2
(45) Date of Patent: Dec. 27, 2022

(54) ELECTRONIC DEVICE AND METHOD FOR PREVENTING MISRECOGNITION BY PROXIMITY SENSOR ACCORDING TO BURN-IN

(71) Applicant: Samsung Electronics Co., Ltd., Suwon-si (KR)

(72) Inventors: Sengtai Lee, Suwon-si (KR); Hyunseung Yoon, Suwon-si (KR); Seokjoon Park, Suwon-si (KR); Yonghwan Hyun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 152 days.

(21) Appl. No.: 17/096,242

(22) Filed: Nov. 12, 2020

(65) Prior Publication Data
US 2021/0153325 A1 May 20, 2021

(30) Foreign Application Priority Data
Nov. 14, 2019 (KR) .......................... 10-2019-0146149

(51) Int. Cl.
*H05B 47/11* (2020.01)
*H05B 47/13* (2020.01)
*G01S 17/04* (2020.01)
*G01S 17/08* (2006.01)

(52) U.S. Cl.
CPC .............. *H05B 47/11* (2020.01); *G01S 17/08* (2013.01); *H05B 47/13* (2020.01)

(58) Field of Classification Search
CPC .......... H05B 47/11; H05B 47/13; G01S 17/08
See application file for complete search history.

(56) References Cited

U.S. PATENT DOCUMENTS

| 10,165,661 | B2 | 12/2018 | Thijssen et al. |
| 2009/0073141 | A1* | 3/2009 | Chino ..................... G06F 3/042 |
| | | | 345/175 |
| 2010/0271321 | A1 | 10/2010 | Senda et al. |
| 2018/0348049 | A1 | 12/2018 | Toon et al. |
| 2018/0357952 | A1* | 12/2018 | Yang ..................... G09G 3/3208 |
| 2019/0102016 | A1 | 4/2019 | Kim et al. |

FOREIGN PATENT DOCUMENTS

| JP | 2014-011507 A | 1/2014 |
| KR | 10-2018-0121329 A | 11/2018 |

OTHER PUBLICATIONS

International Search Report and written opinion dated Mar. 15, 2021 issued in International Application No. PCT/KR2020/015771.

* cited by examiner

*Primary Examiner* — Henry Luong
(74) *Attorney, Agent, or Firm* — Jefferson IP Law, LLP

(57) ABSTRACT

An electronic device for preventing misrecognition by a proximity sensor is provided. The electronic device includes a display, a proximity sensor disposed under the display, at least one processor operatively connected with the display and the proximity sensor, and a memory operatively connected with the processor. The memory stores instructions that, when executed, cause the at least one processor to in response to the display being turned on, detect a light entering the proximity sensor by using the proximity sensor, calibrate a reference range, based on a characteristic of the entering light, and identify whether an external object is close to the electronic device, based on the calibrated reference range.

22 Claims, 9 Drawing Sheets

ELECTRONIC DEVICE AND METHOD FOR PREVENTING MISRECOGNITION BY PROXIMITY SENSOR ACCORDING TO BURN-IN

CROSS-REFERENCE TO RELATED APPLICATION(S)

This application is based on and claims priority under 35 U.S.C. § 119 of a Korean patent application number 10-2019-0146149, filed on Nov. 14, 2019, in the Korean Intellectual Property Office, the disclosure of which is incorporated by reference herein in its entirety.

BACKGROUND

1. Field

The disclosure relates to an electronic device and a method for preventing misrecognition by a proximity sensor according to burn-in.

2. Description of Related Art

An electronic device may include a proximity sensor to identify a nearby object based on light of a set wavelength. The proximity sensor of the electronic device may be disposed on a back portion of a display, such that it is not visually recognized.

The above information is presented as background information only to assist with an understanding of the disclosure. No determination has been made, and no assertion is made, as to whether any of the above might be applicable as prior art with regard to the disclosure.

SUMMARY

A burn-in phenomenon that changes color reproducibility may occur in the display as time of use increases. The burn-in of the display causes an irreversible change and thus the color reproducibility of the display may further be degraded as the time of use of the display increases.

As burn-in occurs in the display, light of the display may include light of a wavelength for determining the presence of a nearby object. When the light of the display includes light of a set wavelength, the proximity sensor of the electronic device may recognize in error the light of the display as reflected light of an object. In this case, the electronic device may recognize in error that there exists an object even when there does not exist an object on the periphery of the proximity sensor.

Aspects of the disclosure are to address at least the above-mentioned problems and/or disadvantages and to provide at least the advantages described below. Accordingly, an aspect of the disclosure is to provide an electronic device and a method for preventing misrecognition by a proximity sensor according to burn-in.

In accordance with an aspect of the disclosure, an electronic device is provided. The electronic device includes a display, a proximity sensor disposed under the display, at least one processor operatively connected with the display and the proximity sensor, and a memory operatively connected with the at least one processor. The memory stores instructions that, when executed by the at least one, cause the at least one processor to in response to the display being turned on, detect a light entering the proximity sensor by using the proximity sensor, calibrate a reference range, based on a characteristic of the light entering the proximity sensor, and identify whether an external object is close to the electronic device, based on the calibrated reference range.

In accordance with another aspect of the disclosure, an electronic device is provided. The electronic device includes a display, a proximity sensor having a light emitting element and a light receiving element which are positioned under the display, and at least one processor operatively connected with the display and the proximity sensor. The at least one processor is configured to receive a light through the light receiving element of the proximity sensor while a light is being emitted through the display, determine whether a characteristic of the light received through the light receiving element is related to a characteristic of a light of a set wavelength emitted by the light emitting element of the proximity sensor, and calibrate a reference range of the proximity sensor based on the determined result.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
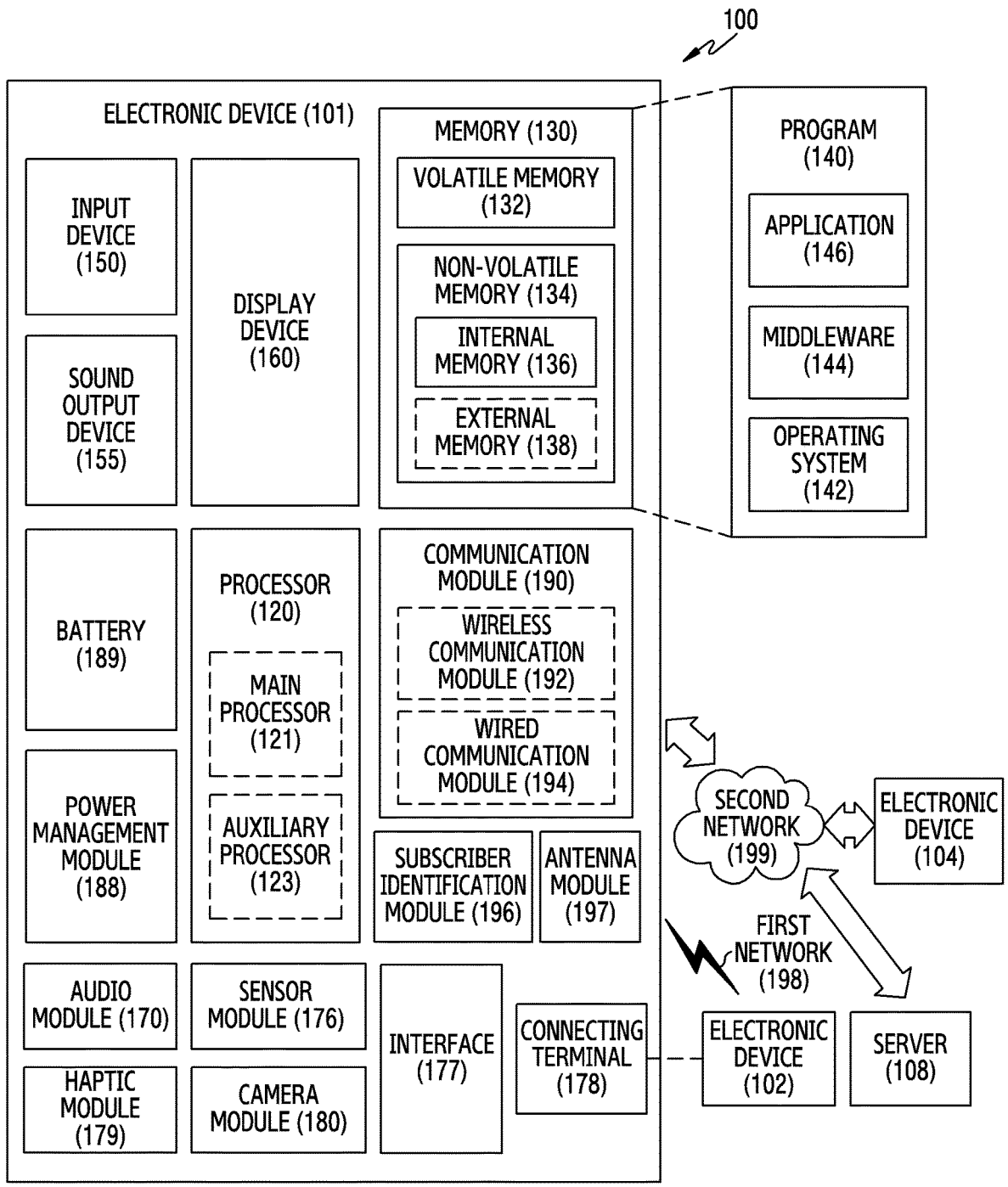
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190 (e.g., a transceiver), a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) there between via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
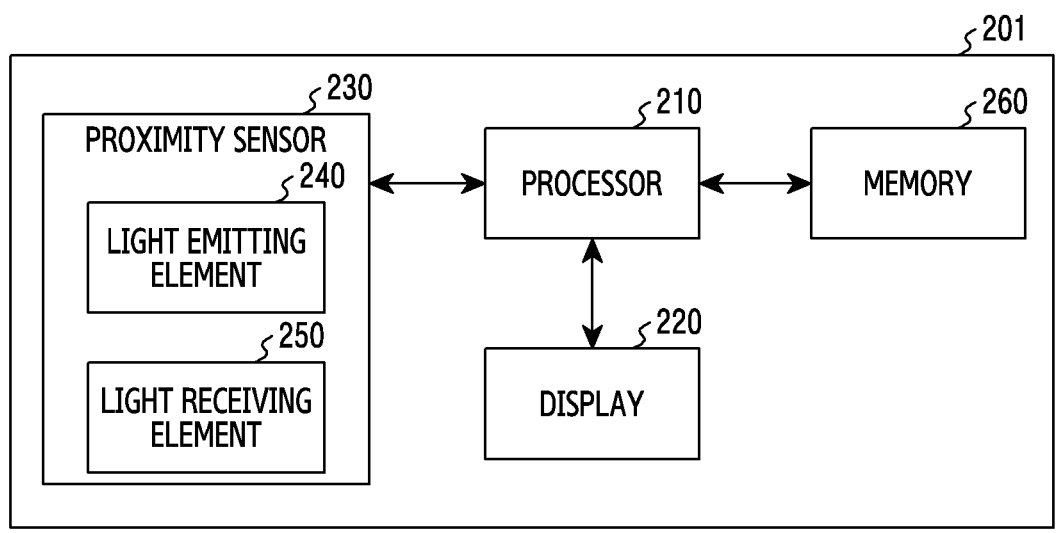
FIG. 2A is a block diagram of an electronic device according to an embodiment of the disclosure.
Figure 2B:
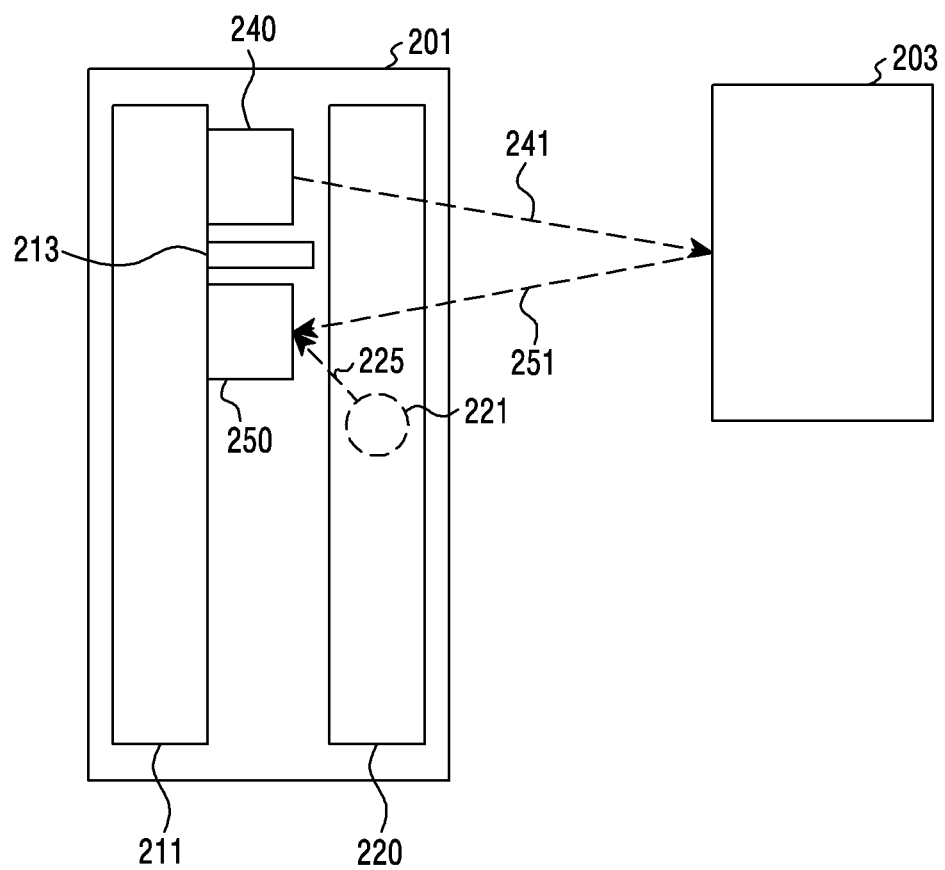
FIG. 2B is a view illustrating an operation of measuring a distance to an object in the electronic device according to an embodiment of the disclosure.

FIG. 2A is a block diagram of an electronic device 201 according to an embodiment of the disclosure. FIG. 2B is a view illustrating an operation of measuring a distance to an object 203 in the electronic device 201 according to an embodiment of the disclosure.

Referring to FIG. 2A, the electronic device 201 in an embodiment may include a processor 210, a display 220, a proximity sensor 230, a memory 260, or a combination thereof. In an embodiment, the proximity sensor 230 may include a light emitting element 240, a light receiving element 250, or a combination thereof. In an embodiment, the proximity sensor 230 may be referred to as an illuminance sensor.

In an embodiment, the electronic device 201 may correspond to the electronic device 101 of FIG. 1. In an embodiment, the processor 210, the display 220, the proximity sensor 230, and the memory 260 may correspond to the processor 120, the display device 160, the sensor module 176, and the memory 130 of FIG. 1, respectively.

Referring to FIG. 2B, the light emitting element 240 or the light receiving element 250 in an embodiment may be disposed on a substrate 211. In an embodiment, the light emitting element 240 or the light receiving element 250 may be disposed under the display 220 when the display 220 is viewed from above. In an embodiment, the light emitting element 240 or the light receiving element 250 may be disposed under the display 220 to be covered by the display 220 when the display 220 is viewed from above. In an embodiment, the light emitting element 240 or the light receiving element 250 may be covered by the display 220 not to be recognized by a user when the display 220 is viewed from above.

In an embodiment, a configuration 213 may further exist between the light emitting element 240 and the light receiving element 250 to prevent a light 241 of the light emitting element 240 from being directly transmitted to the light receiving element 250.

In an embodiment, the processor 210 may emit the light 241 of a set wavelength by using the light emitting element 240. In an embodiment, the set wavelength may be a wavelength corresponding to an infrared ray. In an embodiment, the set wavelength may be a wavelength of 940 nanometers (nm) and there around. In an embodiment, the processor 210 may control to emit the light 241 of the set wavelength at predetermined intervals by using the light emitting element 240. In an embodiment, the wavelength of 940 nanometers (nm) and there around may be a wavelength of a range from 900 to 1000 nanometers (nm). In an embodiment, the wavelength of 940 nanometers (nm) and there around may be a wavelength of a range from 920 to 960 nanometers (nm).

In an embodiment, the processor 210 may identify a light 251 of the set wavelength by using the light receiving element 250. In an embodiment, the processor 210 may identify the light 251 of the set wavelength in the light received by the light receiving element 250. In an embodiment, the processor 210 may identify the light 251 which is reflected by the object 203 after the light 241 is emitted.

In an embodiment, the processor 210 may identify the presence or absence of the object 203 based on the light 251. In an embodiment, when an intensity of the light 251 falls within a designated reference range (for example, 90-120 inclusive), the processor 210 may identify that there exists the object 203. In an embodiment, when a value outputted based on the light 251 from among values 0 to 255, which are outputtable by the light receiving element 250, falls within the reference range (for example 90-120 inclusive), the processor 210 may identify that there exists the object 203. In an embodiment, the processor 210 may perform a function corresponding to the presence or absence of the object 203. In an embodiment, the processor 210 may turn off the display 220 based on the object 203 being identified, while providing a communication function. In an embodiment, the processor 210 may turn on the display 220 based on the object 203 not being identified while providing the communication function. In an embodiment, the processor 210 may turn on the display 220 based on the object 203 being identified in the turn-off state of the display 220.

In an embodiment, the display 220 may have burn-in as time passes. In an embodiment, as burn-in occurs, the display 220 may emit light of a wavelength that may be recognized by the light receiving element 250. In an embodiment, as burn-in occurs in a certain area 221 of the display 220, the certain area 221 may emit a light 225 of a wavelength that may be recognized by the light receiving element 250. In an embodiment, as burn-in occurs in the certain area 221 of the display 220, the display 220 may emit light of a wavelength (for example, an infrared ray) longer than light of a designated wavelength in spite of a command of the processor 210 to emit the light of the designated wavelength (for example, a visible ray).

In an embodiment, the light receiving element 250 may receive the light 225 of the display 220. In an embodiment, the processor 210 may identify in error the presence or absence of the object 203 due to the light 225 of the display 220 received by the light receiving element 250. For example, the processor 210 may identify in error that there exists the object 203 due to the light 225 of the display 220 received by the light receiving element 250 even when there does not exist the object 203.

In an embodiment, to prevent misrecognition caused by burn-in, the processor 210 may calibrate a reference range. In an embodiment, the processor 210 may calibrate the reference range by adding a compensation value to the reference range. For example, the processor 210 may calibrate the reference range by adding a compensation value to an upper limit value and/or a lower limit value of the reference range, respectively. In an embodiment, to prevent misrecognition caused by burn-in, the processor 210 may identify the presence or absence of the object 203 based on the reference range to which the compensation value is applied. In an embodiment, the processor 210 may determine whether to calibrate the reference range, based on the light 251 received by the light receiving element 250. In an embodiment, the processor 210 may determine whether to add the compensation value to the reference range, based on the light 251 received by the light receiving element 250. In an embodiment, the processor 210 may determine whether to add the compensation value to the reference range, based on a wavelength included in the light 251 received by the light receiving element 250. In an embodiment, the processor 210 may determine to add the compensation value to the reference range, based on a wavelength other than the set wavelength (for example, the wavelength of 940 nanometers (nm) and there around) being included in the light 251 received by the light receiving element 250. In an embodiment, the processor 210 may calibrate the reference value by adding the compensation value (for example, 10) to the reference range (for example, 90-120 inclusive). For example, if the reference range is 90-120 inclusive, the reference range to which the compensation value is added may be 100-130 inclusive.

In an embodiment, the processor 210 may determine whether to calibrate the compensation value, based on the light 251 received by the light receiving element 250, while a user input (for example, a touch input on the display 220, a movement on the electronic device 201) is not being received. In an embodiment, the processor 210 may emit light of a designated wavelength (for example, a wavelength of 400 to 500 nanometers (nm)) through the display 220 while a user input is not being received. In an embodiment, the processor 210 may display an image of a pre-designated single color (for example, a color corresponding to the wavelength of 400 to 500 nanometers (nm)) through the display 220, thereby allowing the display 220 to emit the light of the designated wavelength (for example, the wavelength of 400 to 500 nanometers (nm)). In an embodiment, the processor 210 may display the pre-designated single color image on a certain area (for example, an area including an area overlapping the proximity sensor 230 among the areas of the display 220) of the display 220, thereby allowing the display 220 to emit the light of the designated wavelength. In an embodiment, the processor 210 may determine whether to calibrate the reference range, based on the light 225 of the display 220 received by the light receiving element 250. In an embodiment, when the light 225 of the display 220 received by the light receiving element 250 includes the light of the set wavelength (for example, the wavelength of 940 nanometers (nm) and there around), the processor 210 may determine to calibrate the reference range. In an embodiment, when the light of the set wavelength (for example, the wavelength of 940 nanometers (nm) and there around) that is included in the light 225 of the display 220 received by the light receiving element 250 exceeds the reference range, the processor 210 may determine to calibrate the reference range. In an embodiment, the processor 210 may calibrate the reference range by adding a set value (for example, 10) to the reference range.

In an embodiment, when a cumulative operating time of the display 220 exceeds a designated cumulative operating time (for example, 300 hours), the processor 210 may emit the light of the designated wavelength through the display 220. In an embodiment, when the light 225 of the display 220 received by the light receiving element 250 includes the light of the set wavelength (for example, the wavelength of 940 nanometers (nm) and there around), the processor 210 may determine to calibrate the reference range. In an embodiment, when the light of the set wavelength (for example, the wavelength of 940 nanometers (nm) and there around) that is included in the light 225 of the display 220 received by the light receiving element 250 exceeds the reference range, the processor 210 may determine to calibrate the reference range. In an embodiment, it is illustrated that, when the cumulative operating time of the display 220 exceeds the designated cumulative operating time (for example, 300 hours), the processor 210 emits the light of the designated wavelength through the display 220, but this is merely an example. In an embodiment, every time the accumulative operating time of the display 220 increases by a designated excess cumulative operating time (for example, 10 hours) after the cumulative operating time of the display 220 exceeds the designated cumulative operating time (for example, 300 hours), the processor 210 may emit the light of the designated wavelength through the display 220.

In an embodiment, when the cumulative number of light emissions of the light emitting element 240 exceeds a designated number of light emissions (for example, 73,000 times), the processor 210 may emit the light of the designated wavelength through the display 220. In an embodiment, when the light 225 of the display 220 received by the light receiving element 250 includes the light of the set wavelength (for example, the wavelength of 940 nanometers (nm) and there around), the processor 210 may determine to calibrate the reference range. In an embodiment, when the light of the set wavelength (for example, the wavelength of 940 nanometers (nm) and there around) that is included in the light 225 of the display 220 received by the light receiving element 250 exceeds the reference range, the processor 210 may determine to calibrate the reference range. In an embodiment, it is illustrated that, when the cumulative number of light emissions of the light emitting element 240 exceeds the designated number of light emissions (for example, 73,000 times), the processor 210 emits the light of the designated wavelength through the display 220, but this is merely an example. In an embodiment, every time the cumulative number of light emissions of the light emitting element 240 increases by a designated excess cumulative number of light emissions (for example, 50,000 times) after the cumulative number of light emissions of the light emitting element 240 exceeds the designated number of light emissions (73,000 times), the processor 210 may emit the light of the designated wavelength through the display 220.

In an embodiment, the processor 210 may determine whether a characteristic of light received through the light receiving element 250 is related to a characteristic of the light of the designated wavelength emitted by the light emitting element 240 of the proximity sensor 230.

In an embodiment, when a wavelength of light received through the light receiving element 250 is identified as corresponding to the set wavelength emitted by the light emitting element 240 of the proximity sensor 230, the processor 210 may determine that the characteristic of the light received through the light receiving element 250 is related to the characteristic of the light of the designated wavelength emitted by the light emitting element 240. In an embodiment, when the wavelength of the light received through the light receiving element 250 is identified as being included in the set wavelength emitted by the light emitting element 240 of the proximity sensor 230, the processor 210 may determine that the characteristic of the light received through the light receiving element 250 is related to the characteristic of the light of the designated wavelength emitted by the light emitting element 240. In an embodiment, the set wavelength may be a wavelength that is used to identify the presence or absence of the nearby object 203.

In an embodiment, the set wavelength may be a wavelength of 940 nanometers (nm) and there around. In an embodiment, the wavelength of 940 nanometers (nm) and there around may be a wavelength of a range from 900 to 1000 nanometers (nm). In an embodiment, the wavelength of 940 nanometers and there around may be a wavelength of a range from 920 to 960 nanometers (nm).

In an embodiment, when an intensity of the light of the set wavelength in the light received through the light receiving element 250 is identified as exceeding a reference intensity, the processor 210 may determine that the characteristic of the light received through the light receiving element 240 is related to the characteristic of the light of the set wavelength emitted by the light emitting element 240 of the proximity sensor 230. In an embodiment, the reference intensity may indicate a designated value for the processor 210 to identify burn-in of the display 220. In an embodiment, the reference intensity may have one fixed value or may have a value that increases in response to an increase of the reference range.

In an embodiment, the processor 210 may calibrate the reference range of the proximity sensor 230, based on the result of determination.

In an embodiment, the electronic device 201 may continuously increase the reference range for identifying the presence or absence of the object 203, so that misrecognition of the object 203 can be reduced even when the light 225 is received at the light receiving element 250 due to burn-in of the display 220.

Figure 2C:
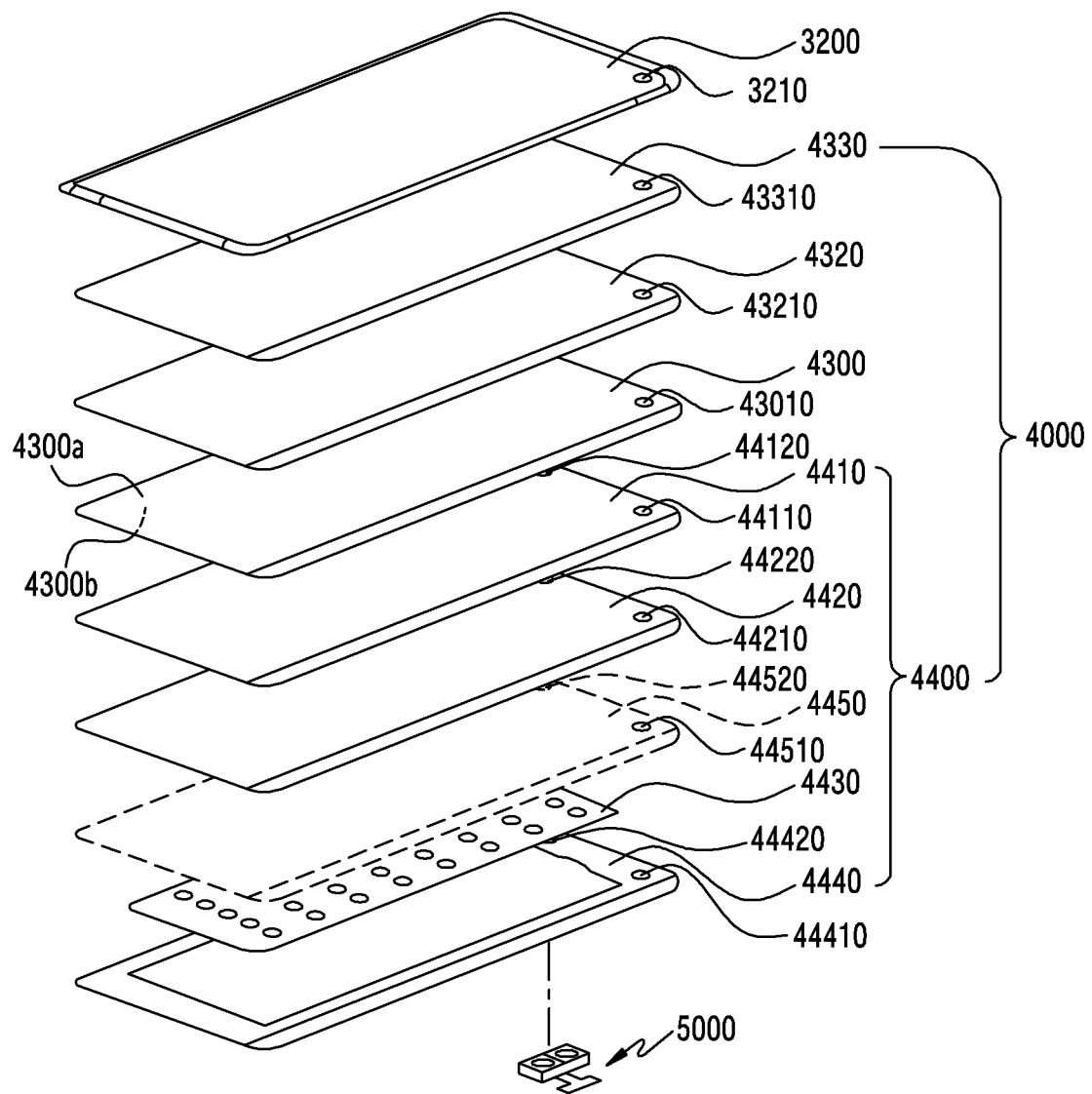
FIG. 2C is an exploded perspective view of a display according to an embodiment of the disclosure.

FIG. 2C is an exploded perspective view of a display 4000 according to an embodiment of the disclosure. The display 4000 of FIG. 2C may correspond to the display 160 of FIG. 1, the display 220 of FIG. 2A, and the display 220 of FIG. 2B.

Referring to FIG. 2C, the display 4000 may include a display panel 4300 including a polarizer 4320 (POL) (for example, a polarized film) disposed through an adhesive member of a rear surface of a front surface cover 3200 (for example, a front surface plate, a glass plate, or a cover member), and at least one subsidiary material layer 4400 attached to a rear surface 4300b of the display panel 4300. According to an embodiment, the POL 4320 may be attached to a front surface 4300a of the display panel 4300. According to an embodiment, the adhesive member may include an optical clear adhesive (OCA), a pressure sensitive adhesive (PSA), a thermal responsive adhesive, a normal adhesive, or a double-sided tape.

According to an embodiment, the front surface cover 3200 may include a camera exposure area 3210 disposed on a position corresponding to a camera module (for example, the camera module 180 of FIG. 1). According to an embodiment, the camera exposure area 3210 may be determined by a printed area (for example, a black matrix (BM) area) disposed to surround the periphery thereof. According to an embodiment, the size or shape of the printed area may be determined by an angle of view of the camera module 180. In an embodiment, the front surface cover 3200 may include only the camera exposure area 3210 without an extra printed area.

According to an embodiment, the display panel 4300 and the POL 4320 may be integrally formed with each other. According to an embodiment, the display 4000 may additionally include a touch panel 4330. According to an embodiment, the display 4000 may operate as a touch display of an in-cell method or an on-cell method according to a disposal position of the touch panel 4330. In an embodiment, the display 4000 may include a fingerprint sensor (not shown) operating through the display panel

4300. According to an embodiment, the fingerprint sensor may include an ultrasonic or optical fingerprint sensor which is contacted by an outer surface of the front surface cover 3200 through a hole formed on a certain component of the components of the display 4000 at least in part, or which can recognize the fingerprint of approaching finger.

According to an embodiment, the at least one subsidiary material layer 4400 may include at least one polymer member 4410, 4420 disposed on the rear surface 4300*b* of the display panel 4300, at least one functional member 4430 disposed on a rear surface of the at least one polymer member 4410, 4420, and a conductive member 4440 disposed on a rear surface of the at least one functional member 4430. According to an embodiment, the at least one polymer member 4410, 4420 may include an embossed layer 4410 to remove bubbles generated between the display panel 4300 and its lower attachments materials, and/or a cushion layer 4430 disposed to mitigate impact. According to an embodiment, the at least one functional member 4430 may include a graphite sheet for heat dissipation, an added display, a force touch flexible printed circuit board (FPCB) (hereinafter, referred to as an "FPCB"), a fingerprint sensor FPCB, a communication antenna emitter, a heatsink sheet, a conductive tape, a nonconductive tape, or an open cell sponge. According to an embodiment, the conductive member 4440 may be a metal plate and may help in reinforcing rigidity of the electronic device (for example, the electronic device 201 of FIG. 2A), and may be used to block an ambient noise and to dissipate heat emitted from a peripheral heat emission component. According to an embodiment, the conductive member 4440 may include copper (Cu), aluminum (Al), stainless steel (for example, steel special user stainless (SUS)), clad (for example, a layered member in which SUS and aluminum (Al) are alternately disposed).

In an embodiment, the display 4000 may further include a detection member 4450 to detect an input by a writing member (for example, an electronic pen) of an electromagnetic induction method. According to an embodiment, the detection member 4450 may include a digitizer. According to an embodiment, the detection member 4450 may be disposed between the at least one polymer member 4420 and the functional member 4430. In an embodiment, the detection member 4450 may be disposed between the display panel 4300 and the at least one polymer member 4410.

According to an embodiment, the front surface cover 3200 may include the camera exposure area 3210 formed on an area thereof overlapping the display panel 4300 at least in part when viewed from above. According to an embodiment, the display panel 4300 may include an opening 43010 formed on an area thereof overlapping the camera exposure area 3210 when the front surface cover 3200 is viewed from above. According to an embodiment, the POL 4320 and/or the touch panel 4330 attached to the display panel 4300 may include openings 43210, 43310 formed on corresponding positions thereof. According to an embodiment, the at least one subsidiary material layer 4400 may include openings 44110, 44210, 44410, 44510 formed on positions corresponding to the opening 43010 when the front surface cover 3200 is viewed from above.

The electronic device (for example, the electronic device 201 of FIG. 2A) according to embodiments of the disclosure may include an optical sensor module 5000 (for example, the proximity sensor 230 of FIG. 2A) disposed by being attached to a rear surface of the display 4000. According to an embodiment, the optical sensor module 5000 may include various sensor modules to detect an external environment by detecting light emitted through the display 4000 and reflected from an external object. According to an embodiment, the optical sensor module 5000 may include at least one of a camera module, an ultraviolet (UV) sensor module, an iris sensor module, a spectrum sensor module, an infrared sensor module, an RGB sensor module, or a time of flight (TOF) sensor module. In an embodiment, the optical sensor module 5000 may correspond to the proximity sensor 230 of FIGS. 2A and 2B.

According to an embodiment, the optical sensor module 5000 may emit light through the display panel 4300 and may receive emitted light, but light may not pass through the subsidiary material layer 4400. Accordingly, the subsidiary material layer 4400 may include at least one penetrating hole 44120, 44220, 44420, 44520 formed on a corresponding position to accommodate light emitted from the optical sensor module 5000 disposed on a lower portion thereof and received. In another embodiment, if the optical sensor module 5000 is a camera sensor module or a TOF module, the display panel 4300 and the POL 4320 may have penetrating holes formed on corresponding positions thereof.

Figure 2D:
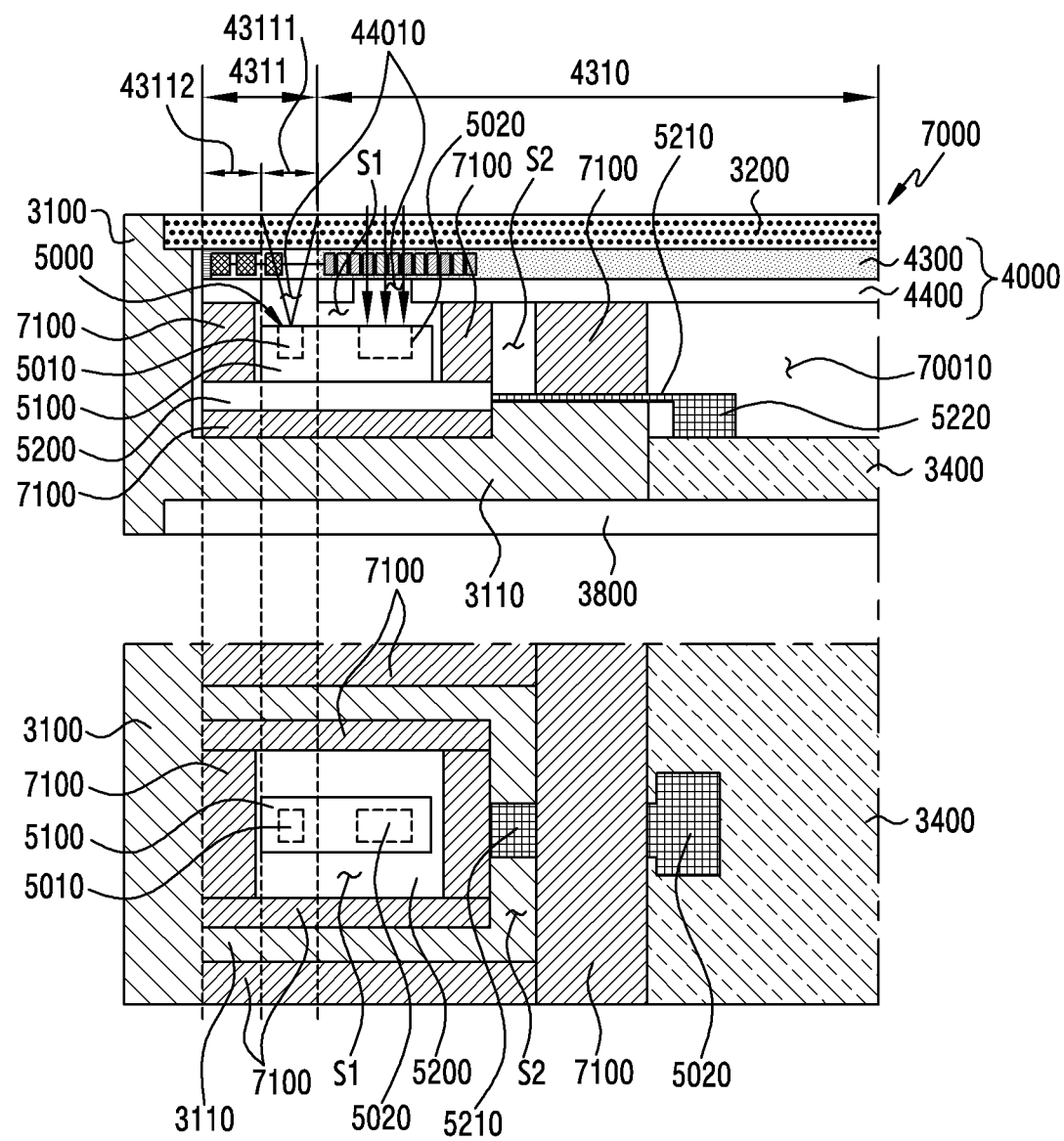
FIG. 2D is a view illustrating a partial cross-section view of an electronic device including an optical sensor module, and an arrangement structure of the optical sensor module according to an embodiment of the disclosure.

FIG. 2D is a view illustrating a partial cross-section view of an electronic device 7000 including an optical sensor module 5000, and illustrating an arrangement structure of the optical sensor module 5000 according to an embodiment of the disclosure.

The electronic device 7000 of FIG. 2D may correspond to the electronic device 101 of FIG. 1, or the electronic device 201 of FIGS. 2A and 2B. A display 4000 of FIG. 2D may correspond to the display device 160 of FIG. 1, the display 220 of FIG. 2A, and the display 220 of FIG. 2B. The optical sensor module 5000 of FIG. 2D may correspond to the proximity sensor 230 of FIGS. 2A and 2B.

The components assigned the same reference numerals in FIGS. 2C and 2D may indicate the same components.

Referring to FIG. 2D, the electronic device 7000 may include a housing structure including the front surface cover 3200 (for example, a cover member, a front surface plate, a front surface window, or a first plate), a rear surface cover 3800 (for example, a rear surface cover member, a rear surface plate, a rear surface window, or a second plate) facing in the opposite direction of the front surface cover 3200, and a side surface member 3100 surrounding a space 70010 between the front surface cover 3200 and the rear surface cover 3800. According to an embodiment, the side surface member 3100 may include a support member 3110 extended toward the inner space 70010 of the electronic device 7000 at least in part. According to an embodiment, the support member 3110 may be formed by being structurally coupled with the side surface member 3100. According to an embodiment, the support member 3110 may have a structural shape to support at least a portion of the optical sensor module 5000 disposed on the subsidiary material layer 4400 of the display 4000.

According to an embodiment, the electronic device 7000 may include the display 4000 disposed in the inner space 70010 to be seen from the outside through at least a portion of the front surface cover 3200. According to an embodiment, the display 4000 may include the display panel 4300 attached to the front surface cover 3200, and the subsidiary material layer 4400 attached to the rear surface of the display panel 4300. According to an embodiment, the display panel 4300 may include a display area 4310 having a first transmissivity, a first non-display area 43111 adjacent to the display area 4310 and having a second transmissivity higher than the first transmissivity, and a second non-display area 43112 adjacent to the first non-display area 43111.

According to various embodiments, the electronic device 7000 may include the optical sensor module 5000 disposed in the inner space 70010 by being attached to the subsidiary material layer 4400 of the display 4000. According to an embodiment, the optical sensor module 5000 may be disposed to have a light emitting structure 5010 overlap the first non-display area 43111 and to have a light receiving structure 5020 overlap the display area 4310 when the display 4000 is viewed from above. According to an embodiment, since the subsidiary material layer 4400 does not allow light to pass there through, the subsidiary material layer 4400 may include at least one penetrating hole 44010 formed from areas facing the light emitting structure 5010 and the light receiving structure 5020 to the display panel 4300. According to an embodiment, the at least one penetrating hole 44010 may be formed on an area corresponding to the light emitting structure 5010 and an area corresponding to the light receiving structure 5020, respectively. In an embodiment, the at least one penetrating hole 44010 may be formed as one hole from the area corresponding to the light emitting structure 5010 to the area corresponding to the light receiving structure 5020.

According to an embodiment, the optical sensor module 5000 may include an FPCB 5200 (for example, a printed circuit board), a module housing 5100 mounted on the FPCB 5200, and the light emitting structure 5010 and the light receiving structure 5020 which are spaced apart from each other to be exposed from the module housing 5100 at least in part, and are electrically connected with the FPCB 5200. According to an embodiment, the optical sensor module 5000 may include an extension portion 5210 extended from the FPCB 5200, and an electric connector 5220 mounted on an end of the extension portion 5210. According to an embodiment, the electric connector 5220 may be electrically connected to a printed circuit board 3400 (for example, a main printed circuit board) separately disposed in the inner space 70010 of the electronic device 7000.

According to various embodiments, the optical sensor module 5000 may be disposed with the FPCB 5200 being attached to the subsidiary material layer 4400 of the rear surface of the display 400 through at least one waterproof member 7100 (for example, a waterproof tape). According to an embodiment, the module housing 5100 of the optical sensor module 5000 may be disposed to have a first sealing structure S1 for sealing the module housing 5100 through at least one waterproof member 7100 (for example, a waterproof tape) disposed between the subsidiary material layer 4400 and the FPCB 5200. For example, the at least one waterproof member 7100 may be disposed on the FPCB 5200 to surround the module housing 5100, and then, may be attached to the subsidiary material layer 4400, thereby attaching the optical sensor module 5000 to the rear surface of the display 4000. According to an embodiment, the optical sensor module 5000 may be disposed to have a second sealing structure S2 including the FPCB 5200 and sealing through at least one waterproof member 7100 disposed between the subsidiary material layer 4400 and the support member 3110. According to an embodiment, since the optical sensor module 5000 is attached to the rear surface of the display 4000 through the first sealing structure S1 and the second sealing structure S2, foreign substances and/or moisture can be prevented from flowing in through the penetrating hole 44010 formed on the subsidiary material layer 4400. According to an embodiment, when the display 4000 is disposed through the side surface member 3100 and the support member 3110 of the electronic device 7000, the FPCB 5200 may be attached to the support member 3110 through the waterproof member 7100 (for example, a double-sided tape).

Since the optical sensor module 5000 according to embodiments of the disclosure has an arrangement configuration directly attached to the rear surface of the display 4000 by using the FPCB 5200 which is separately provided from the printed circuit board 3400, a sensing error caused by a tilt tolerance (for example, the optical sensor module being disposed to be tilted) can be prevented, and an effective arrangement design in which the optical sensor module 5000 is disposed up to the uppermost end of the display 4000 separately from the printed circuit board 3400 is possible.

Figure 3:
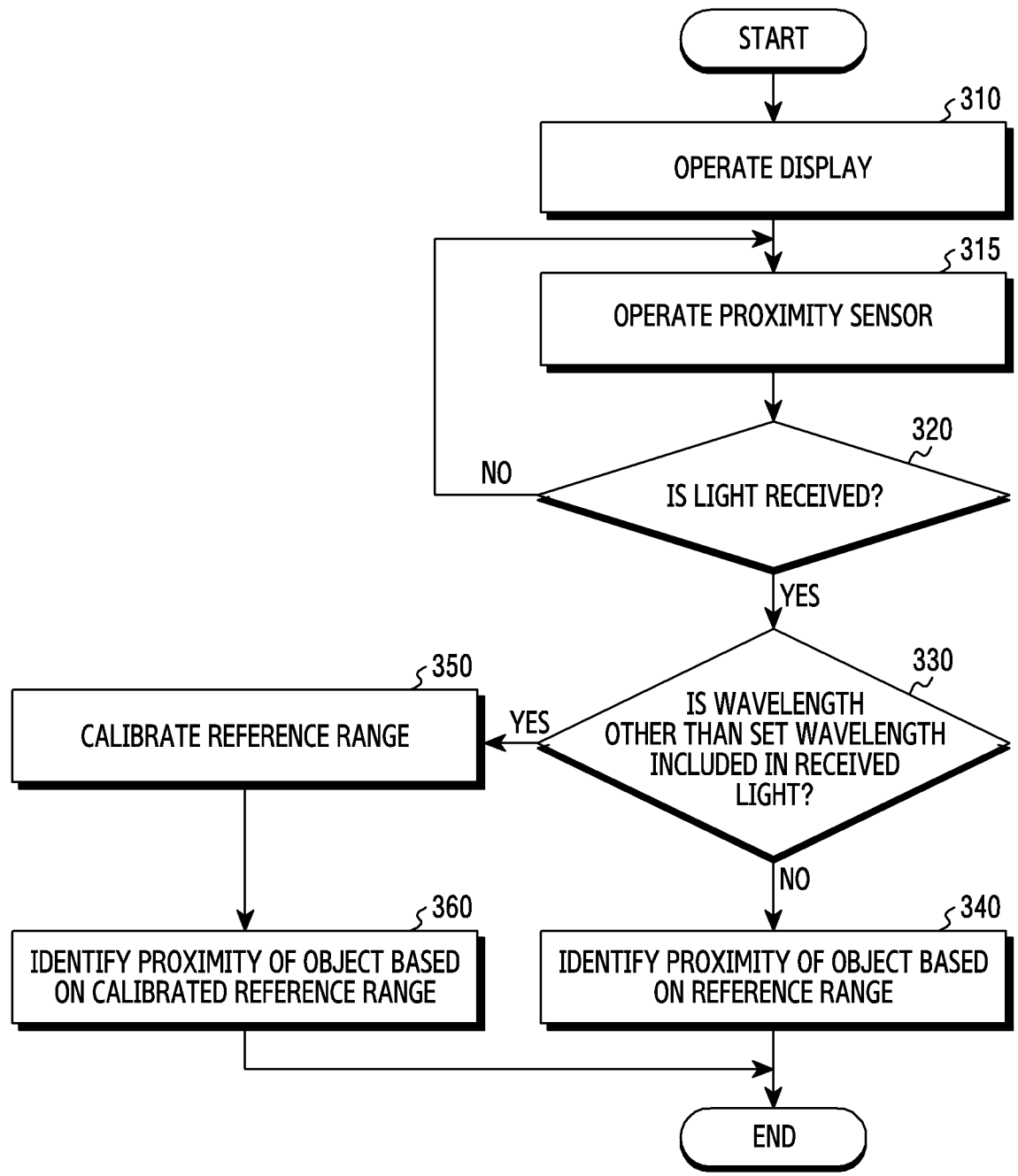
FIG. 3 is a flowchart illustrating an operation of calibrating a reference range in an electronic device according to an embodiment of the disclosure.

FIG. 3 is a flowchart illustrating an operation of calibrating a reference range in an electronic device (for example, the electronic device 201) according to an embodiment of the disclosure. FIG. 3 will be described with reference to FIGS. 2A and 2B.

Referring to FIG. 3, in operation 310, the processor 210 may operate the display 220. In an embodiment, the processor 210 may operate the display 220 by controlling to display a predetermined screen through the display 220. In an embodiment, the display 220 may emit light to the outside as the predetermined screen is displayed.

In operation 315, the processor 210 may operate the proximity sensor 230. In an embodiment, the processor 210 may emit the light 241 of the set wavelength to the outside through the light emitting element 240. In an embodiment, while a designated application is running, the processor 210 may emit the light 241 of the set wavelength to the outside through the light emitting element 240. In an embodiment, the designated application may be an application providing a communication function.

In operation 320, the processor 210 may identify whether the light 251 is received through the proximity sensor 230. In an embodiment, the processor 210 may identify whether the light 251 of the set wavelength is received through the light receiving element 250.

In an embodiment, when it is identified that the light 251 is received through the light receiving element 250 ('Yes' in operation 320), the processor 210 may perform operation 330. In an embodiment, when it is identified that the light 251 is not received through the light receiving element 250 ('No' in operation 320), the processor 210 may perform operation 315 again.

In operation 330, the processor 210 may identify whether the light 251 received through the proximity sensor 230 includes a wavelength other than the set wavelength. In an embodiment, the set wavelength may be a wavelength corresponding to an infrared ray. In an embodiment, the set wavelength may be a wavelength of 940 nanometers (nm) and there around.

In an embodiment, when it is identified that the light 251 received through the proximity sensor 230 does not include a wavelength other than the set wavelength ('No' in operation 330), the processor 210 may perform operation 340. In an embodiment, when it is identified that the light 251 received through the proximity sensor 230 includes a wavelength other than the set wavelength ('Yes' in operation 330), the processor 210 may perform operation 350.

In operation 340, the processor 210 may identify whether the object 203 is nearby based on the reference range. In an embodiment, the processor 210 may identify that the object 203 is nearby when an intensity of the received light 251 falls within the reference range. In an embodiment, the reference range may be a reference range calibrated most recently. In an embodiment, the reference range may be a range according to a factor initial value.

In an embodiment, the processor 210 may perform a function corresponding to the presence or absence of the object 203 from among functions of the running application. In an embodiment, the processor 210 may turn off the display 220, based on it being identified that the object 203 is nearby, while providing the communication function through the running application. In an embodiment, the processor 210 may maintain the turn-on state of the display 220 based on it being identified that the object 203 is not nearby, while providing the communication function through the running application. The processor 210 may perform operation 315 periodically or in response to a movement of the electronic device 201 in the turn-on state of the display 220.

In operation 350, the processor 210 may calibrate the reference range. In an embodiment, the processor 210 may calibrate the reference range by adding a set value (for example, 10) to an upper limit value and/or a lower limit value of the reference range.

In operation 360, the processor 210 may identify whether the object 203 is nearby, based on the calibrated reference range. In an embodiment, when the intensity of the received light 251 falls within the calibrated reference range, the processor 210 may identify that the object 203 is nearby. In an embodiment, the calibrated reference range may be a range which increases from the most recently calibrated reference range by the set value.

In an embodiment, the processor 210 may perform a function corresponding to the presence or absence of the object 203 from among the functions of the running application. In an embodiment, the processor 210 may turn off the display 220, based on it being identified that the object 203 is nearby, while providing the communication function through the running application. In an embodiment, the processor 210 may maintain the turn-on state of the display 220, based on it being identified that the object 203 is not nearby, while providing the communication function through the running application. The processor 210 may perform operation 315 periodically or in response to a movement of the electronic device 201 in the turn-on state of the display 220.

Figure 4:
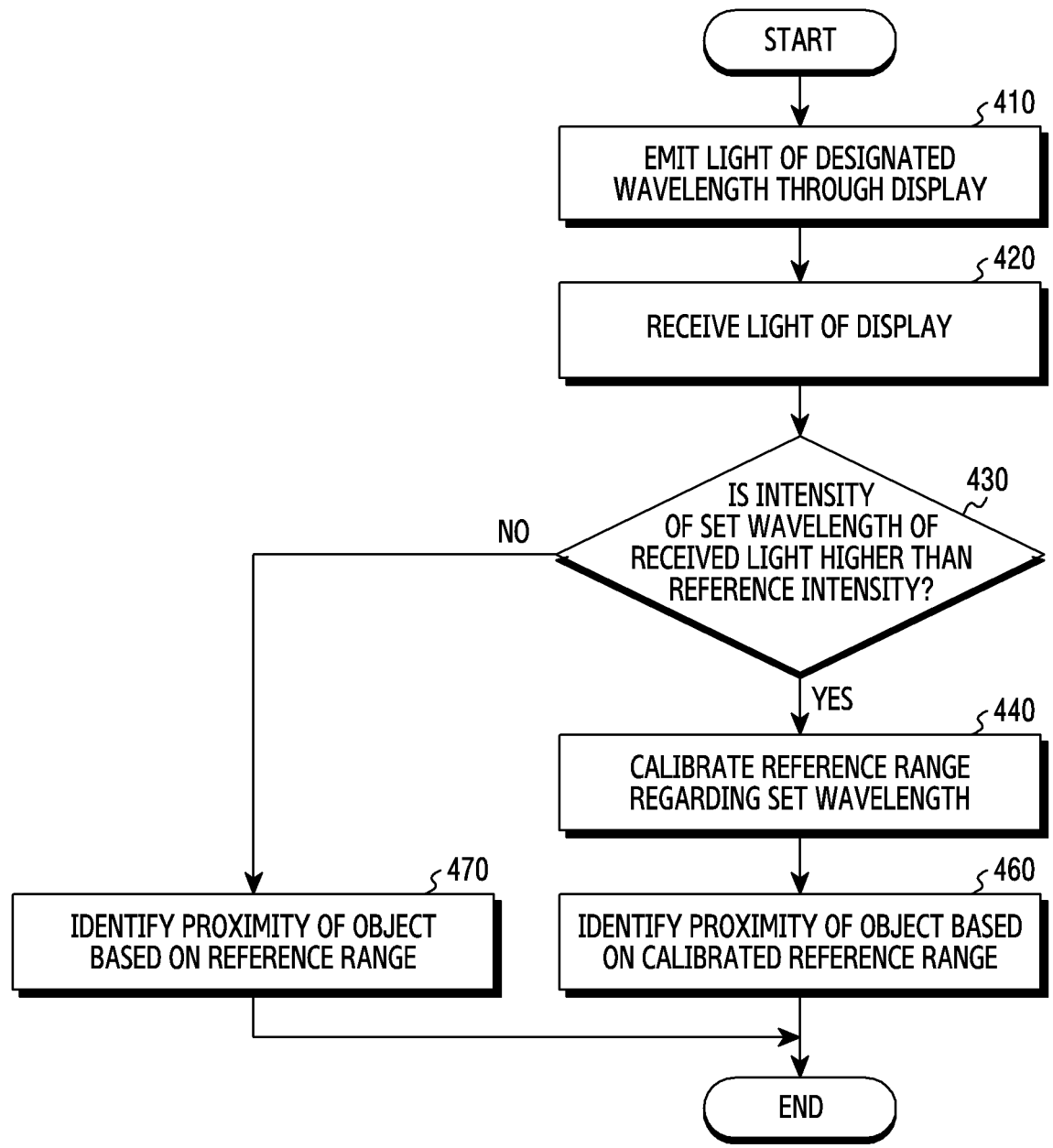
FIG. 4 is a flowchart illustrating an operation of calibrating a reference range in an electronic device according to an embodiment of the disclosure.

FIG. 4 is a flowchart illustrating an operation of calibrating a reference range in an electronic device (for example, the electronic device 201) according to an embodiment of the disclosure. FIG. 4 will be described with reference to FIGS. 2A and 2B.

Referring to FIG. 4, in operation 410, the processor 210 may emit light of a designated wavelength through the display 220. In an embodiment, the processor 210 may emit the light of the designated wavelength (for example, a wavelength of 400 to 500 nanometers (nm)) through the display 220, by displaying a pre-designated image (for example, a single color image corresponding to a wavelength of 400 to 500 nanometers (nm)) through the display 220. In an embodiment, the processor 210 may emit the light of the designated wavelength through a predetermined area of the display 220. In an embodiment, the predetermined area of the display 220 may include an area of the display 220 that covers the proximity sensor 230. For example, the predetermined area of the display 220 may be the first non-display area 43210 of FIG. 2D. In an embodiment, the predetermined area of the display 220 may include an area of the display 220 that covers the proximity sensor 230, and a peripheral area thereof.

In an embodiment, as burn-in occurs in a certain area 221 of the display 220, the certain area 221 of the display 220 may emit the light 225 of the wavelength that may be recognized by the light receiving element 250, other than the light of the designated wavelength.

In operation 420, the processor 210 may receive the light 251, 225 through the proximity sensor 230. In an embodiment, the processor 210 may receive the light 251, 225 through the light receiving element 250 of the proximity sensor 230. In an embodiment, the processor 210 may receive the light 225 of a set wavelength that is emitted by the display 220, through the light receiving element 250.

In operation 430, the processor 210 may identify whether an intensity of the received light 251, 225 is higher than a designated reference intensity. In an embodiment, the reference intensity may be an intensity that is designated with respect to a wavelength of light emitted by the display 220. In an embodiment, the reference intensity may indicate a designated value for identifying burn-in of the display 220. In an embodiment, the reference intensity may have one fixed value or may have a value that increases according to increase of a reference range.

In an embodiment, when a value indicated by the intensity of the received light 251, 225 is greater than a value indicated by the designated reference intensity, the processor 210 may identify that the intensity of the received light 251, 225 is higher than the designated reference intensity. In an embodiment, when the value indicated by the intensity of the received light 251, 225 is not greater than the value indicated by the designated reference intensity, the processor 210 may identify that the intensity of the received light 251, 225 is not higher than the designated reference intensity.

In an embodiment, when it is identified that the intensity of the received light 251, 225 is higher than the designated reference intensity ('Yes' in operation 430), the processor 210 may perform operation 440. In an embodiment, when it is identified that the intensity of the received light 251, 225 is not higher than the designated reference intensity ('No' in operation 430), the processor 210 may perform operation 470.

In operation 440, the processor 210 may calibrate a reference range regarding a set wavelength. In an embodiment, the processor 210 may calibrate the reference range by adding a set value (for example, 10) to an upper limit value and/or a lower limit value of the reference range regarding the set wavelength. In an embodiment, the set wavelength may be a wavelength that is used to identify whether the object 203 is nearby. In an embodiment, the set wavelength may be a wavelength of 940 nanometers (nm) and there around. In an embodiment, the wavelength of 940 nanometers (nm) and there around may be a wavelength of a range from 900 to 1000 nanometers (nm). In an embodiment, the wavelength of 940 nanometers (nm) and there around may be a wavelength of a range from 920 to 960 nanometers (nm).

In operation 460, the processor 210 may identify whether the object 203 is nearby, based on the calibrated reference range regarding the set wavelength. In an embodiment, the processor 210 may identify that the object 203 is nearby when the intensity of the received light 251 falls within the calibrated reference range.

In operation 470, the processor 210 may identify whether the object is nearby, based on the reference range regarding the set wavelength. In an embodiment, when the intensity of the received light 251 falls within the reference range, the processor 210 may identify that the object 203 is nearby.

Figure 5:
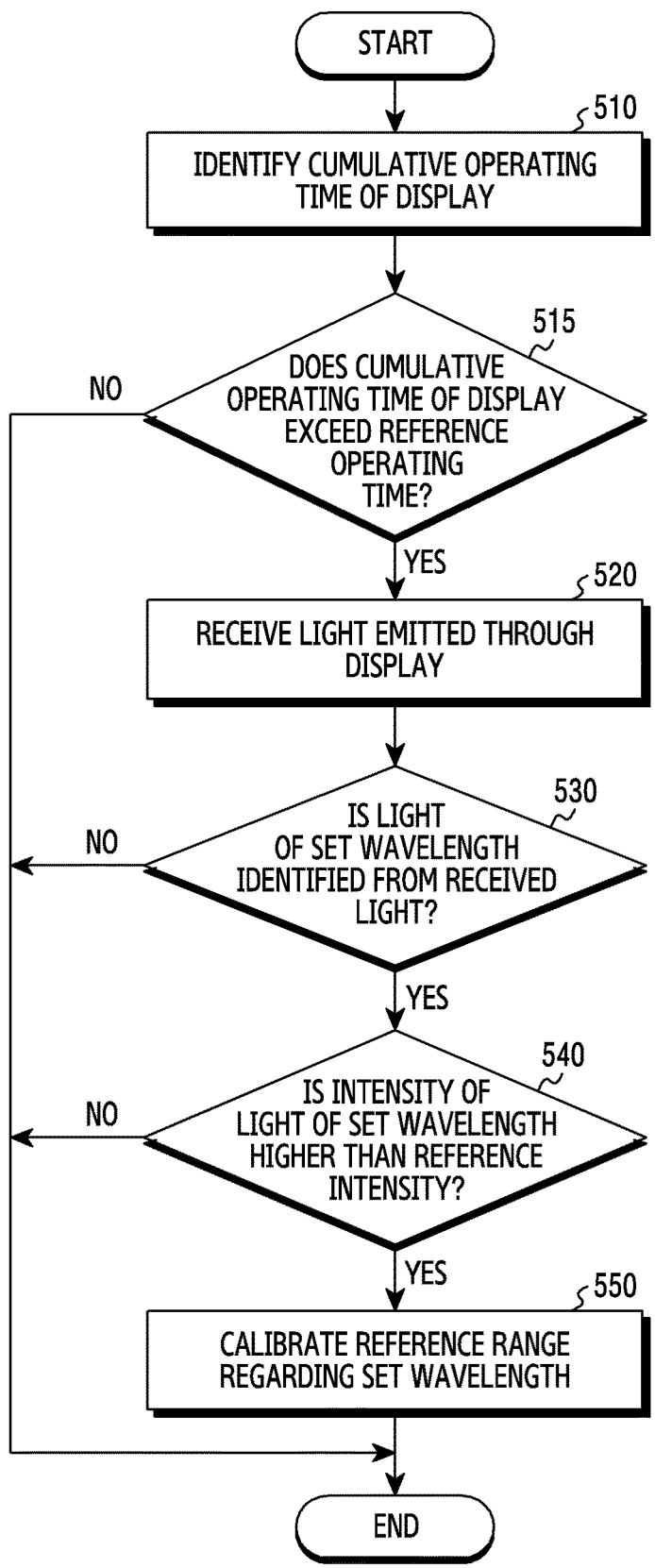
FIG. 5 is a flowchart illustrating an operation of calibrating a reference range based on an operating time of a display in an electronic device according to an embodiment of the disclosure.

FIG. 5 is a flowchart illustrating an operation of calibrating a reference range based on an operating time of a display (for example, the display 220) in an electronic device (for example, the electronic device 201) according to an embodiment of the disclosure. FIG. 5 will be described with reference to FIGS. 2A and 2B.

Referring to FIG. 5, in operation 510, the processor 210 may identify a cumulative operating time of the display 220.

In operation 515, the processor 210 may identify whether the cumulative operating time of the display 220 exceeds a reference operating time. In an embodiment, the reference operating time may be 300 hours.

In an embodiment, when it is identified that the cumulative operating time exceeds the reference operating time ('Yes' in operation 515), the processor 210 may perform operation 520. In an embodiment, when it is identified that the cumulative operating time does not exceed the reference operating time ('No' in operation 515), the processor 210 may finish the operation of calibrating the reference range.

In operation 520, the processor 210 may receive light emitted through the display 220, through the light receiving element 250. In an embodiment, the processor 210 may emit light by operating the display 220, and may receive light emitted by the display 220 through the light receiving element 250. In an embodiment, the processor 210 may emit light through the display 220, by displaying a pre-designated image (for example, a single color image corresponding to a wavelength of 400 to 500 nanometers (nm)) through the display 220. In an embodiment, as burn-in occurs in the certain area 221 of the display 220, the processor 210 may receive the light 225 of the set wavelength emitted by the certain area 221 of the display 220 through the light receiving element 250. In an embodiment, the set wavelength may be a wavelength that is used to identify whether the object 203 is nearby. In an embodiment, the set wavelength may be a wavelength of 940 nanometers (nm) and there around. In an embodiment, the wavelength of 940 nanometers (nm) and there around may be a wavelength of a range from 900 to 1000 nanometers (nm). In an embodiment, the wavelength of 940 nanometers (nm) and there around may be a wavelength of a range from 920 to 960 nanometers (nm).

In operation 530, the processor 210 may determine whether the light of the set wavelength is identified from the light of the display 220 received through the light receiving element 250.

In an embodiment, when the light of the set wavelength is identified from the light of the display 220 received through the light receiving element 250 (for example, 'Yes' in operation 530), the processor 210 may perform operation 540. In an embodiment, when the light of the set wavelength is not identified from the light of the display 220 received through the light receiving element 250 ('No' in operation 530), the processor 210 may finish the operation of calibrating the reference range.

In operation 540, the processor 210 may determine whether an intensity of the light of the set wavelength that is included in the light of the display 220 received through the light receiving element 250 is higher than a reference intensity.

In an embodiment, when it is identified that the intensity of the light of the set wavelength is higher than the reference intensity ('Yes' in operation 540), the processor 210 may perform operation 550. In an embodiment, when it is identified that the intensity of the light of the set wavelength is not higher than the reference intensity ('No' in operation 540), the processor 210 may finish the operation of calibrating the reference range.

In operation 550, the processor 210 may calibrate the reference range regarding the set wavelength. In an embodiment, the processor 210 may calibrate the reference range by adding a set value (for example, 10) to the reference range regarding the set wavelength.

In an embodiment, every time the cumulative operating time exceeds an excess reference operating time after the cumulative operating time exceeds the reference operating time, the processor 210 may perform the operation of calibrating the reference range based on the operating time of the display 220. In an embodiment, the excess reference operating time may be 10 hours.

In an embodiment, the processor 210 may identify whether the object 203 is nearby, based on the calibrated reference range, after the reference range is calibrated.

Figure 6:
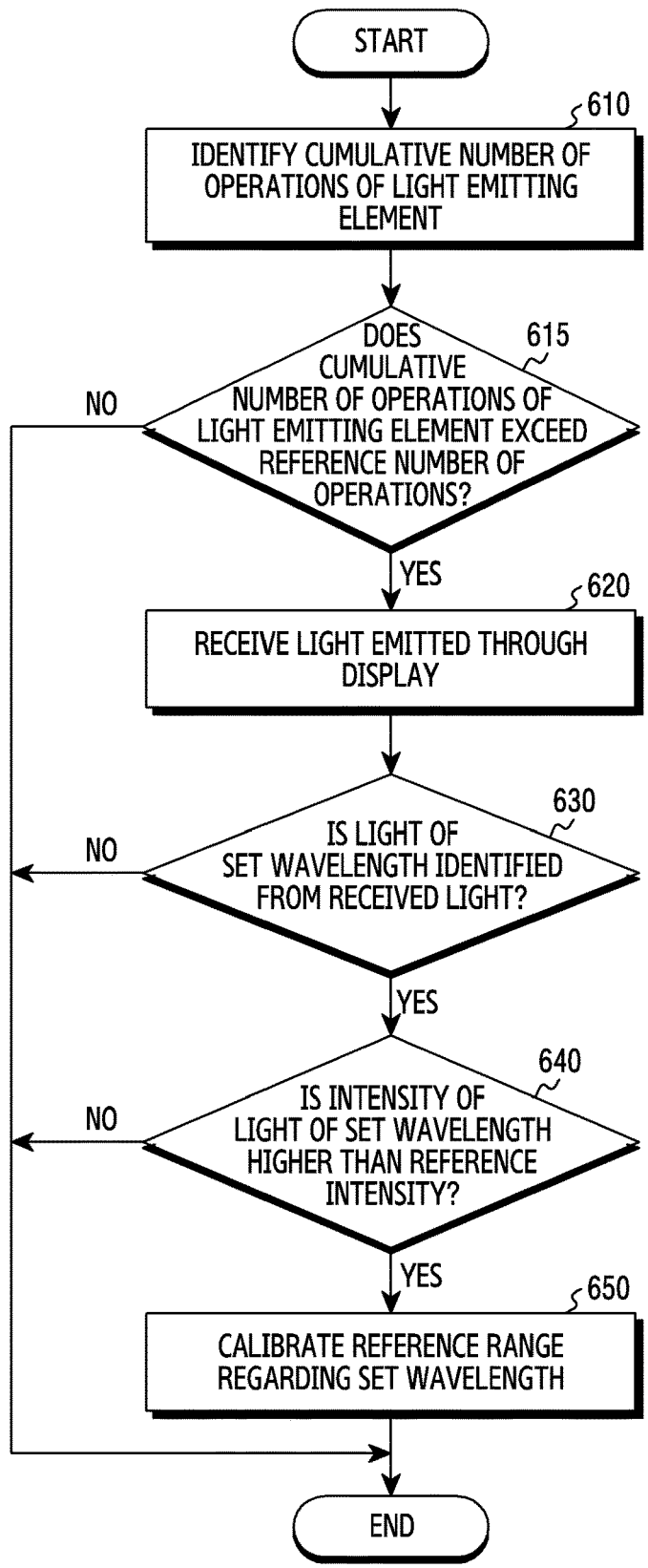
FIG. 6 is a flowchart illustrating an operation of calibrating a reference range, based on the number of operations of a proximity sensor in an electronic device according to an embodiment of the disclosure.

FIG. 6 is a flowchart illustrating an operation of calibrating a reference range based on the number of operations of a proximity sensor (for example, the proximity sensor 230) in an electronic device (for example, the electronic device 201) according to an embodiment of the disclosure. FIG. 6 will be described with reference to FIGS. 2A and 2B.

Referring to FIG. 6, in operation 610, the processor 210 may identify the cumulative number of operations of the proximity sensor 230. In an embodiment, the processor 210 may identify the cumulative number of operations of the light receiving element 250.

In operation 615, the processor 210 may identify whether the cumulative number of operations of the proximity sensor 230 exceeds the reference number of operations. In an embodiment, the reference number of operations may be 73,000 times.

In an embodiment, when it is identified that the cumulative number of operations of the proximity sensor 230 exceeds the reference number of operations ('Yes' in operation 615), the processor 210 may perform operation 620. In an embodiment, when it is identified that the cumulative number of operations of the proximity sensor 230 does not exceed the reference number of operations ('No' in operation 615), the processor 210 may finish the operation of calibrating the reference range.

In operation 620, the processor 210 may receive light emitted through the display 220 through the light receiving element 250. In an embodiment, the processor 210 may emit light by operating the display 220, and may receive light emitted by the display 220 through the light receiving element 250. In an embodiment, the processor 210 may emit light through the display 220, by displaying a pre-designated image (for example, a single color image corresponding a wavelength of 400 to 500 nanometers (nm)). In an embodiment, as burn-in occurs in the certain area 221 of the display 220, the processor 210 may receive the light 225 of the set wavelength emitted from the certain area 221 of the display 220 through the light receiving element 250. In an embodiment, the set wavelength may be a wavelength that is used to identify whether the object 203 is nearby. In an embodiment, the set wavelength may be a wavelength of 940 nanometers (nm) and there around. In an embodiment, the wavelength of 940 nanometers (nm) and there around may be a wavelength of a range from 900 to 1000 nanometers (nm). In an embodiment, the wavelength of 940 nanometers (nm) and there around may be a wavelength of a range from 920 to 960 nanometers.

In operation 630, the processor 210 may determine whether the light of the set wavelength is identified from the light of the display 220 received through the light receiving element 250.

In an embodiment, when the light of the set wavelength is identified from the light of the display 220 received through the light receiving element 250 ('Yes' in operation 630), the processor 210 may perform operation 640. In an embodiment, when the light of the set wavelength is not identified from the light of the display 220 received through the light receiving element 250 ('No' in operation 630), the processor 210 may finish the operation of calibrating the reference range.

In operation 640, the processor 210 may determine whether an intensity of the light of the set wavelength that is included in the light of the display 220 received through the light receiving element 250 is higher than a reference intensity.

When it is determined that the intensity of the light of the set wavelength is higher than the reference intensity ('Yes' in operation 640), the processor 210 may perform operation 650. In an embodiment, when it is identified that the intensity of the light of the set wavelength is not higher than the reference intensity ('No' in operation 640), the processor 210 may finish the operation of calibrating the reference range.

In operation 650, the processor 210 may calibrate the reference range regarding the set wavelength. In an embodiment, the processor 210 may calibrate the reference range by adding a set value (for example, 10) to the reference range regarding the set wavelength.

In an embodiment, every time the cumulative number of operations exceeds an excess reference number of operations after the cumulative number of operations of the proximity sensor 230 exceeds the reference number of operations, the processor 210 may perform the operation of calibrating the reference range, based on the number of operations of the proximity sensor 230. In an embodiment, the excess reference number of operations may be 50,000 times.

In an embodiment, the processor 210 may identify whether the object 203 is nearby, based on the calibrated reference range, after the reference range is calibrated.

As described above, the electronic device 201 according to an embodiment and the method can prevent misrecognition of the presence or absence of a nearby object caused by burn-in, by continuously increasing a value for determining whether the object is nearby.

As described above, the electronic device 201 may include the display 220, the proximity sensor 230 disposed under the display 220, and the processor 210 operatively connected with the display 220 and the proximity sensor 230, and the memory 260 operatively connected with the processor 210, and the memory 260 may instructions that, when being executed, cause the processor 210 to: in response to the display 220 being turned on, detect a light 225, at area 221, entering the proximity sensor 230 by using the proximity sensor 230; calibrate a reference range, based on a characteristic of the entering light 225, at area 221; and identify whether an external object 203 is close to the electronic device 201, based on the calibrated reference range.

In an embodiment, when being executed, the instructions may cause the processor 210 to: emit a light of a designated wavelength through the display 220; in response to the display 220 emitting the light of the designated wavelength, detect a light 251, at area 221, entering the proximity sensor 230 by using the proximity sensor 230; and, based on an intensity of a light of a set wavelength in the light 251, at area 221, entering the proximity sensor 230, calibrate the reference range.

In an embodiment, the set wavelength may be longer than the designated wavelength.

In an embodiment, when being executed, the instructions may cause the processor 210 to, when an intensity of the light of the designated wavelength exceeds a designated intensity, calibrate the reference range by adding a set value to at least one value of an upper limit value or a lower limit value of the reference range.

In an embodiment, when being executed, the instructions may cause the processor 210 to emit the light of the designated wavelength by displaying a designated image through the display 220.

In an embodiment, when being executed, the instructions may cause the processor 210 to display the designated image on an area including an area that overlaps a disposal position of the proximity sensor 230 from among areas of the display 220.

In an embodiment, when being executed, the instructions may cause the processor 210 to display the designated image through the display 220, based on a cumulative light emitting time of the display 220.

In an embodiment, when being executed, the instructions may cause the processor 210 to display the designated image through the display 220, based on a cumulative number of operations of the proximity sensor 230.

In an embodiment, when being executed, the instructions may cause the processor 210 to: identify whether a light of a wavelength other than a set wavelength is included in the light entering the proximity sensor; and calibrate the reference range, based on whether the light of the wavelength other than the set wavelength is included.

In an embodiment, when being executed, the instructions may cause the processor 210 to perform a function corresponding to a currently running application, based on a result of identifying whether the external object 203 is close.

The electronic device 201 according to various embodiments may include the display 220, the proximity sensor 230 having the light emitting element 240 and the light receiving element 250 which are positioned under the display 220; and the processor 210 operatively connected with the display 220 and the proximity sensor 230, and the processor 210 may receive a light through the light receiving element 250 of the proximity sensor 230 while a light is being emitted through the display 220, determine whether a characteristic of the light received through the light receiving element 250 is related to a characteristic of a light of a set wavelength emitted by the light emitting element 250 of the proximity sensor 230, and calibrate a reference range of the proximity sensor 230 based on a result of the determining.

In an embodiment, the processor 210 may emit the light through the display 220 by displaying a designated image through the display 220.

In an embodiment, a wavelength of a color indicated by the designated image may be shorter than a designated wavelength emitted by the light emitting element.

In an embodiment, the designated image may be formed with a single color.

In an embodiment, the processor 210 may calibrate the reference range of the proximity sensor 230, by adding a set value to at least one value of an upper limit value or a lower limit value of the reference range.

In an embodiment, the processor 210 may identify whether an object is close, based on the calibrated reference range of the proximity sensor 230.

In an embodiment, when a wavelength of the light received through the light receiving element 250 is identified as corresponding to the set wavelength emitted by the light emitting element 240 of the proximity sensor 230, the processor 210 may determine that the characteristic of the light received through the light receiving element 250 is related to the characteristic of the light of the set wavelength emitted by the light emitting element 240 of the proximity sensor 230.

In an embodiment, when an intensity of the light of the set wavelength emitted by the light emitting element 250 in the light received through the light receiving element is identified as exceeding a reference intensity, the processor 210 may determine that the characteristic of the light received through the light receiving element 250 is related to the characteristic of the light of the set wavelength emitted by the light emitting element 240 of the proximity sensor 230.

In an embodiment, the processor 210 may emit the light through the display 220, based on a cumulative light emitting time of the display 220.

In an embodiment, the processor 210 may emit the light through the display 220, based on a cumulative number of operations of the proximity sensor 230.

The electronic device and the method according to various embodiments can prevent the proximity sensor to misrecognize the presence or absence of a nearby object due to burn-in.

The effect achieved by the disclosure is not limited to that mentioned above, and other effects that are not mentioned above may be clearly understood to those skilled in the art based on the description provided above.

Methods of embodiments mentioned in claims of the disclosure or the specification thereof may be implemented in the form of hardware, software, or a combination of hardware and software.

When implemented in software, a computer readable storage medium storing one or more programs (software modules) may be provided. One or more programs stored on a computer-readable storage medium are configured for execution by one or more processors in an electronic device. One or more programs include instructions that cause an electronic device to execute methods according to embodiments described in the claims or specification of this disclosure.

Such programs (software modules, software) can be stored in non-volatile memory including random access memory and flash memory, read only memory (ROM), electronic erasable programmable read only memory (EEPROM), magnetic disc storage device, compact disc-ROM (CD-ROM), digital versatile discs (DVDs) or other forms of optical storage device and a magnetic cassette. Or, it may be stored in a memory composed of a combination of some or all of them. Also, a plurality of configuration memories may be included.

In addition, the program may be stored in an attachable storage device that can be accessed through a communication network such as the Internet, an Intranet, a local area network (LAN), a wide LAN (WLAN), or a storage area network (SAN), or a combination thereof. Such a storage device can access a device performing an embodiment of the disclosure through an external port. In addition, a separate storage device on the communication network may access a device performing an embodiment of the disclosure.

In the specific embodiments of the disclosure described above, elements included in the disclosure are expressed in singular or plural according to the specific embodiments presented. However, the singular or plural expressions are appropriately selected for the situation presented for convenience of description, and the disclosure is not limited to the singular or plural components, and even a component expressed in plural may be composed of a singular, or a component represented in singular may be composed of plural.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display;
a proximity sensor disposed under the display;
at least one processor operatively connected with the display and the proximity sensor; and
a memory operatively connected with the at least one processor,
wherein the memory stores instructions that, when executed by the at least one processor, cause the at least one processor to:
in response to the display being turned on, detect a light entering the proximity sensor by using the proximity sensor,
identify whether a light of a wavelength other than a set wavelength is included in the light entering the proximity sensor,
calibrate a reference range, based on whether the light of the wavelength other than the set wavelength is included, and
identify whether an external object is close to the electronic device, based on the calibrated reference range.

2. The electronic device of claim 1, wherein, the instructions, when executed by the at least one processor, cause the at least one processor to:
emit a light of a designated wavelength through the display;
in response to the display emitting the light of the designated wavelength, detect the light entering the proximity sensor by using the proximity sensor; and
based on an intensity of a light of the set wavelength in the light entering the proximity sensor, calibrate the reference range.

3. The electronic device of claim 2, wherein the set wavelength is longer than the designated wavelength.

4. The electronic device of claim 2, wherein, the instructions, when executed by the at least one processor, cause the at least one processor to, in case an intensity of the light of the designated wavelength exceeds a designated intensity, calibrate the reference range by adding a set value to at least one value of an upper limit value or a lower limit value of the reference range.

5. The electronic device of claim 2, wherein, the instructions, when executed by the at least one processor, cause the at least one processor to emit the light of the designated wavelength by displaying a designated image through the display.

6. The electronic device of claim 5, wherein, the instructions, when executed by the at least one processor, cause the at least one processor to display the designated image on a display area that at least partially overlaps a disposal position of the proximity sensor.

7. The electronic device of claim 5, wherein, the instructions, when executed by the at least one processor, cause the at least one processor to display the designated image through the display, based on a cumulative light emitting time of the display.

8. The electronic device of claim 5, wherein, the instructions, when executed by the at least one processor, cause the at least one processor to display the designated image through the display, based on a cumulative number of operations of the proximity sensor.

9. The electronic device of claim 1, wherein, the instructions, when executed by the at least one processor, cause the at least one processor to perform a function corresponding to a currently running application, based on a result of identifying whether the external object is close.

10. An electronic device comprising:
a display;
a proximity sensor having a light emitting element and a light receiving element which are positioned under the display; and
at least one processor operatively connected with the display and the proximity sensor,
wherein the at least one processor is configured to:
receive a light through the light receiving element of the proximity sensor while a light is being emitted through the display,
determine whether a characteristic of the light received through the light receiving element is related to a characteristic of a light of a set wavelength emitted by the light emitting element of the proximity sensor, and
calibrate a reference range of the proximity sensor based on the determined result.

11. The electronic device of claim 10, wherein the at least one processor is further configured to emit the light through the display by displaying a designated image through the display.

12. The electronic device of claim 11, wherein a wavelength of a color indicated by the designated image is shorter than a designated wavelength emitted by the light emitting element.

13. The electronic device of claim 11, wherein the designated image is formed with a single color.

14. The electronic device of claim 10, wherein the at least one processor is further configured to calibrate the reference range of the proximity sensor, by adding a set value to at least one value of an upper limit value or a lower limit value of the reference range.

15. The electronic device of claim 10, wherein the at least one processor is further configured to identify whether an object is close, based on the calibrated reference range of the proximity sensor.

16. The electronic device of claim 10, wherein the at least one processor is further configured to, in case a wavelength of the light received through the light receiving element is identified as corresponding to the set wavelength emitted by the light emitting element of the proximity sensor, determine that the characteristic of the light received through the light receiving element is related to the characteristic of the light of the set wavelength emitted by the light emitting element of the proximity sensor.

17. The electronic device of claim 10, wherein the at least one processor is further configured to, in case an intensity of the light of the set wavelength emitted by the light emitting element in the light received through the light receiving element is identified as exceeding a reference intensity, determine that the characteristic of the light received through the light receiving element is related to the characteristic of the light of the set wavelength emitted by the light emitting element of the proximity sensor.

18. The electronic device of claim 10, wherein the at least one processor is further configured to emit the light through the display, based on a cumulative light emitting time of the display.

19. The electronic device of claim 10, wherein the at least one processor is further configured to emit the light through the display, based on a cumulative number of operations of the proximity sensor.

20. The electronic device of claim 19, wherein the at least one processor is further configured to detect burn-in in at least one part of the display.

21. The electronic device of claim 20, wherein the at least one processor is further configured to determine a presence or absence of an object within a predetermined distance from the display.

22. The electronic device of claim 21, wherein the at least one processor is further configured to manage power to the display in the presence or absence of the object within the predetermined distance from the display.

* * * * *